July 2, 1929.  J. N. ALSOP  1,719,354
METHOD OF COLLECTING AND UTILIZING SMOKE
CONSTITUENTS AND THE PRODUCT THEREOF
Original Filed July 11, 1922   2 Sheets-Sheet 1
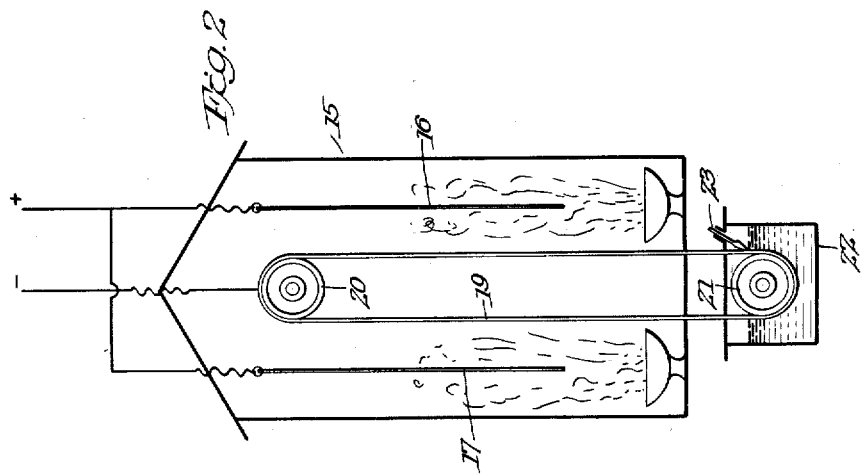
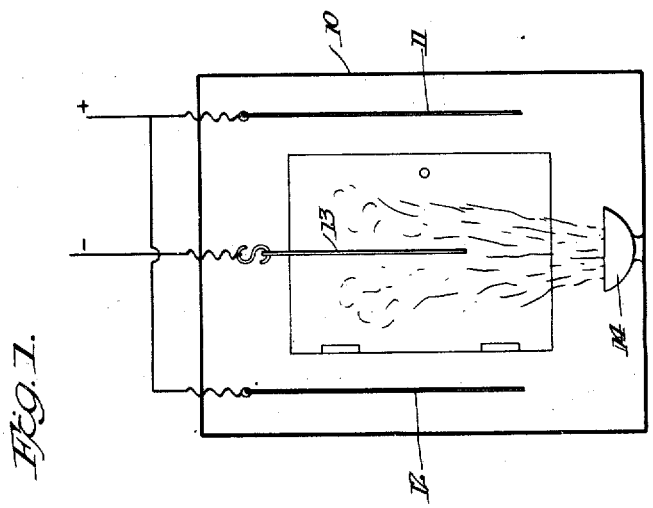
Inventor
James N. Alsop
By Cushman, Bryant & Darby
Attorneys

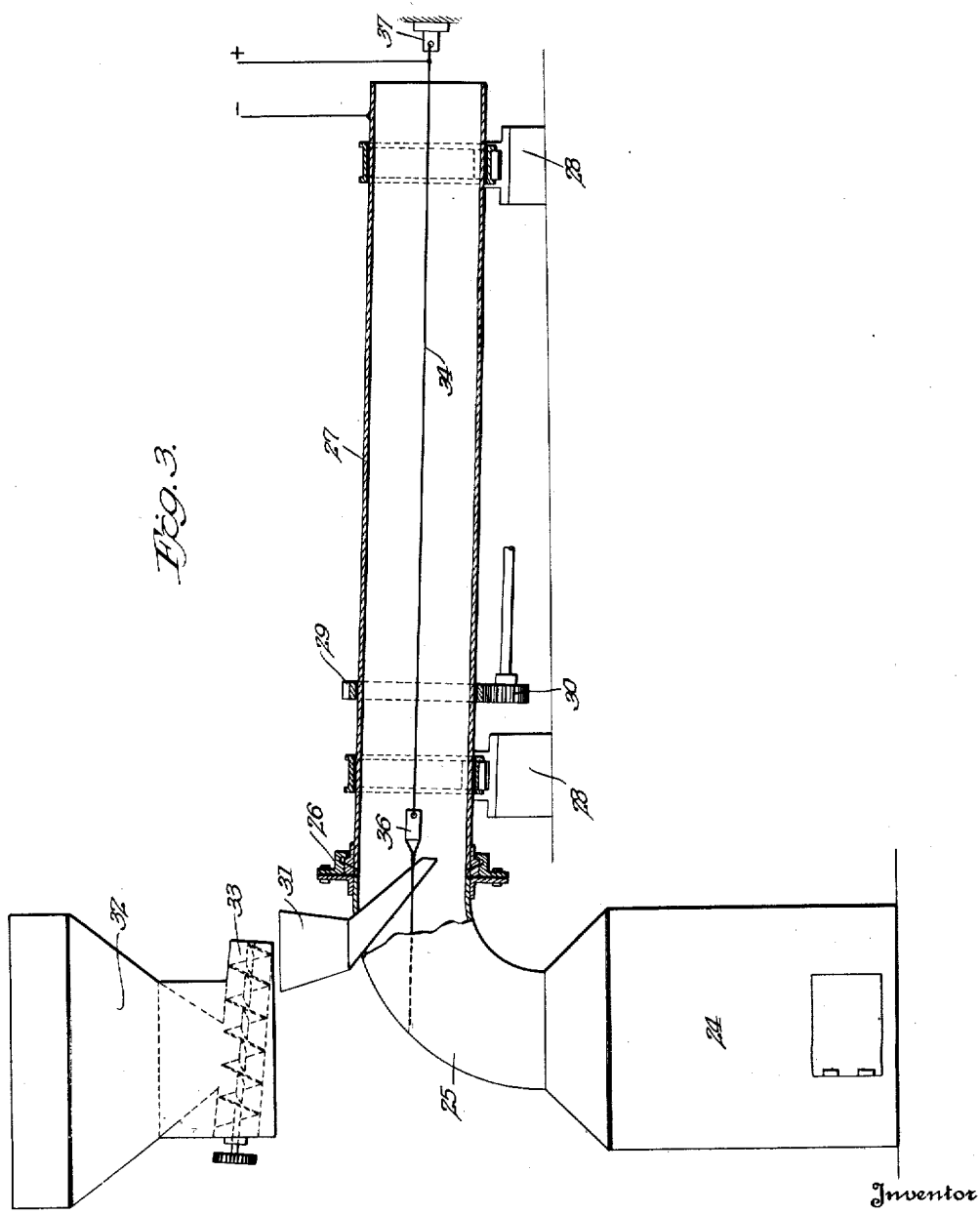

Patented July 2, 1929.

1,719,354

UNITED STATES PATENT OFFICE.

JAMES N. ALSOP, OF OWENSBORO, KENTUCKY.

METHOD OF COLLECTING AND UTILIZING SMOKE CONSTITUENTS AND THE PRODUCT THEREOF.

Application filed July 11, 1922, Serial No. 574,192. Renewed March 22, 1927.

The present invention relates to food products, and more particularly to the art of food preservation. It relates to a method of obtaining from smoke from suitable materials, those constituents which are useful in connection with food products as preservatives or condiments, and, more particularly, in the treatment of salt. The invention also has to do with the improved method of mixing the electrically precipitated constituents of smoke with salt to produce, as a new product, salt mixed with electrically precipitated smoke.

It has long been known that solid and liquid particles may be precipitated from gaseous products, the known art disclosing methods and apparatus for doing this, and this precipitation has generally, and it is believed most successfully, been accomplished by bringing the gaseous product into a field of electric discharge, a uni-directional current being preferably used, suitable electrodes being properly disposed in circuit to establish the proper field of discharge.

So far as I am aware, these systems of electrical precipitation have been for the purpose of throwing down the suspended particles in the gaseous bodies, either to eliminate them, or to detect and register the quantity of suspended matter in the gaseous bodies.

My development has to do with the salvaging of the constituents of the gaseous body or smoke which possess qualities rendering them valuable in various operations in connection with food products, condiments or preservatives, and in the particular illustration here shown, there is involved the further step of applying smoke to salt and coating the salt particles with smoke.

One phase of the method which is particularly important involves the smoking of salt in such a way that the salt particles are thoroughly coated with constituents of the smoke. This may be accomplished effectively by agitating the salt in the smoke, and preferably by repeatedly showering the salt through the smoke in a revolving drum which produces the desired type of agitation or showering. The salt is introduced into the drum, preferably by feeding the same thereinto at one end. While agitating or showering of the salt through the smoke, the latter is continuously introduced into the drum, thereby maintaining a fresh supply of smoke for coating the salt particles. The method may be improved by maintaining within the drum an electrical field for precipitating from the smoke desirable constituents which may be mixed with the salt in order to coat the latter. When the method is practiced in this manner, the salt is not only agitated and showered through the smoke, but also is mixed and agitated in the smoke precipitate.

In practicing my method, a variety of mechanical devices may, of course, be used, and in order that some forms suitable for accomplishing the results aimed at may be illustrated, I have shown in the accompanying drawings different apparatus for carrying out my method.

In said drawings:

Fig. 1 is a conventional view of a simple apparatus for practicing the invention.

Fig. 2 is a similar view of an apparatus by which a continuous operation may be effected.

Fig. 3 is a view partly in section and partly in side elevation of an apparatus capable of continuous operation, and designed, furthermore, for effecting the application of the material derived from the smoke to various food products, salt being the product specifically used.

Referring to the drawings by numbers, like numbers indicating like parts in the several views, and having reference first to Fig. 1, 10 indicates conventionally a chamber within which are suspended two electrodes 11 and 12, these electrodes being in circuit with a suitable source of electrical energy, preferably a generated or corrected uni-directional current, and preferably on the positive side of such circuit.

Between the electrodes 11 and 12 is suspended a collector 13, the example here shown being a plate, preferably of metal, and of proper dimensions. It will be observed that the plate 13 lies between the electrodes 11 and 12, and forms, preferably, the negative pole of the circuit, so that those constituents of any gaseous body which are susceptible to the influence of the field of discharge will be driven against and collected upon the plate 13.

The gaseous body or smoke may be created in any desirable way, and introduced into the chamber 10. As here shown, the brazier 14 is provided, in which may be burned, with the smoke producing flame, any material, the characteristic taste, odor or appearance of which it is desired to secure.

For example, if hickory be burned and the smoke permitted to ascend into the field of electrical discharge, there will be collected upon the plate 13 in the form of a film or coating, a substance which, when applied to any product to which it is desirable to impart the taste, smell and color characteristics of hickory smoke, will give the results sought.

In practical operation, the plate 13, after having been subjected to the action of the smoke passing through the electric field for the desired length of time, can be scraped or brushed so as to remove the material deposited thereon, and this material may be used in various ways. It may be applied directly to the product to be treated, as, for example, pig meat, and I have found that it has desirable curing and seasoning results, and particularly good results are obtained when meat thus treated with the deposit taken from the plate 13 is ground and intimately mixed with this curing and flavoring agent.

Again, the deposit removed from the plate 13 may be brought into solution by mixing it with water or any other suitable liquid or semi-liquid element.

In Fig. 2 I have shown a process by which the deposit and removal of the material obtained from the smoke may be continuously carried on. Referring to Fig. 2, 15 indicates a house or chamber of suitable proportions having, as hereinbefore described, electrodes 16 and 17 in circuit with a source of energy, and preferably coupled to the positive side. between the electrodes 16 and 17 is mounted a movable collector, herein shown as a continuous belt 19 suspended from suitable top and bottom pulleys 20 and 21, any suitable driving means (not shown) being provided to impart travel to the belt 19. The said belt 19 lies between the electrodes 16 and 17, and is coupled to the negative side of the circuit or grounded so that the material which is electrified will be precipitated thereon. The material precipitated from the smoke will be collected in the form of a film or coating exactly as on the stationary plate disclosed and described in connection with Fig. 1. Any smoke producer, as the braziers conventionally shown, may be used.

At its lower end, the belt 19 delivers to a suitable receptacle 22, and abrading means, such as a scraper or brush 23, is provided adjacent the lower end of the belt and above the receptacle 22 to continuously remove from the belt the deposit.

This deposit, which is in the form of a paste-like body, when initially deposited, and before drying out, may be scraped directly into the receptacle 22, and afterwards utilized in the curing and flavoring and imparting characteristic odors to any commodity which it is desirable to treat.

As alternative methods of using the material, it may, if desired, be dried out, and thereafter used either in powdered form, or reduced by moisture to a paste-like consistency. Again, it may be thrown into solution with any suitable solvent and the solution used in the treatment of substances to be cured.

In Figure 3 is shown an apparatus which illustrates how the improved method may be continuously practiced to apply the smoke to salt, which is a new article of manufacture resulting from the operation of this method.

In Fig. 3 is shown conventionally a furnace 24 in which the smoke is generated. The stack 25 extending from the furnace is preferably disposed as shown and bent to deliver horizontally. Coupled to said stack 25 by means of a rotary joint 26 is an inclined, revolving tubular chamber or drum 27. This chamber 27 has substantially imperforate walls so that it may retain the salt while the latter travels therethrough, and may prevent dispersion or loss of the smoke; it is supported on any suitable roll supports 28 and driven in any suitable manner, as, for example, by the gear ring 29, and the gear 30 connected with a suitable motor (not shown).

Mounted in any suitable manner, as, for example, on the stationary stack 25, is a receiving hopper 31, the spout of which extends into and delivers to the rotating chamber 27. The hopper 31 receives material to be treated, in this instance, salt, from any suitable supply, as the bin 32, the screw feed 33 being utilized to deliver from the bin 32 to the hopper 31.

It will be noted that in this form of the invention, salt falling through the spout of the hopper 31 passes through the current of smoke in the stack 25. Further, the salt in traveling through the revolving chamber 27, is, of course, constantly agitated and in the presence of the smoke vapors in this barrel. The result is, of course, not only a mixture of the salt with the electrically precipitated constituents of the smoke, but also with the smoke before precipitation as it passes through the vapors entering the chamber 27 from stack 25, and with such vapors in the chamber as are not precipitated. Moreover, it will be observed that the smoke which enters and fills the chamber 27 is in its natural or vaporous state, i. e., unmixed with any adulterating liquid or the like, and thus the salt is subjected to an unmodified or vaporous smoke in addition to being subjected to the resultant of the electrical action upon the smoke.

Extending lengthwise of the tubular chamber 27 and preferably substantially centrally thereof is an electrode 34, one end being secured for convenience to the stationary stack 25 and insulated therefrom by the insulating connector 36, while the other end of the electrode 34 is carried by any suitable insulating support, as 37 conventionally shown. The electrode 34 is connected with a source of energy, giving, preferably, a uni-directional current, and the other side of the current source is connected to the tubular chamber 27 which forms the other electrode.

As the salt is fed into the drum through the hopper 31, it is repeatedly lifted and dropped by the revolution of the drum or chamber, which also causes the salt to travel therethrough. As will be observed, the wall of the drum is inclined to cause longitudinal travel of the salt. Rotation of the drum repeatedly lifts the salt as it passes therethrough and showers the same through the smoke, which is continuously produced in the furnace 24 and fed into the chamber or drum. There is thus maintained a steady feed of salt and smoke longitudinally of the chamber, and as the salt and smoke travel therethrough, the salt is raised and dropped and showered through the smoke field. At the same time, the electrical field precipitates from the smoke desirable constituents which are mixed with the salt and coat the latter. Hence, the salt is subjected to natural smoke through which it is showered, and to the precipitated constituents of the natural smoke produced by the electrical field.

The tubular chamber 27 may, if desired, be insulated from the other parts of the apparatus by suitable insulations, both at the rotary joint 26, at the roll supports 28, and at the gear ring 30, so that the circuit will be confined to the electrodes, and the current will not pass to the rest of the apparatus. Such insulation of the chamber is not absolutely essential, as it will be sufficient if the electrode 34 be insulated as described above.

It will be understood that the invention is not limited to use of the various forms of apparatus shown, since these apparatus are shown herein simply for the purpose of illustrating the application of the method which is claimed. The apparatus for utilizing this method and producing the improved product "smoked salt", is described and claimed in my co-pending divisional application Serial No. 58,328, filed Sept. 24, 1925.

Where it is stated in the specification or claims that smoke of suitable material is employed, it is meant smoke of such a nature as is useful in the food or food preservative art in connection with the production of a food product, condiment, or preservative, as obviously the invention has no relation to the treatment of smoke of poisonous nature from such a material as coal, or the like.

The salt treated or mixed with the smoke which has been subjected to the electrical field constitutes an extremely pure product which is highly useful in curing meat. Meat cured with such smoked salt need not be hung in a smoke house, as it is thoroughly smoked in the curing. The salt is also useful as a condiment in cooking. It is useful in seasoning vegetables, soups, and meats in cooking, and imparts the characteristic flavor and aroma of hickory wood, when the smoke from such wood has been utilized in the treatment of the salt.

By the statement that the electrical precipitate or the salt treated therewith, is a preservative, is meant any food product useful for food purposes or as a preservative agent in the curing of meat, or as a condiment.

It is to be understood that when defining the product of my improved process, as comprising smoke constituents which have been electrically precipitated, the invention consists in embodying in the product smoke constituents having the nature or characteristics of an electrical precipitate whether the precipitated constituents have been obtained by electrical means or otherwise.

I claim:

1. As a new article of manufacture, salt intermingled with constituents of smoke from suitable material having substantially the characteristics of those constituents obtained by electrical precipitation.

2. The method of producing a food preservative which consists in electrically treating smoke from suitable material, thereby precipitating therefrom desirable constituents on a suitable body, and collecting such constituents from said body.

3. The improved method of producing a preservative which consists in subjecting smoke to an electrical field, thereby precipitating constituents therefrom and mixing said precipitate with salt.

4. The improved method of producing a preservative which consists in subjecting smoke adjacent a suitable body to the action of an electrical field, thereby collecting the smoke constituents precipitated by the field on said body, and removing the precipitate from the body by an abradant action thereon.

5. The improved method of producing a preservative which consists in subjecting smoke adjacent a suitable moving body to the action of an electrical field, thereby collecting the smoke constituents precipitated by the field on said body, and removing the precipitate from the body as it moves.

6. The improved method of producing a preservative which consists in subjecting smoke to an electrical field in a suitable chamber, thereby precipitating constituents of the smoke in said chamber upon a suitable body, and removing the precipitate from the body and mixing the same with salt in said chamber.

7. The improved method of producing a preservative which consists in subjecting smoke to an electrical field in a suitable manner, thereby precipitating constituents of the smoke in said chamber upon a suitable body, and mixing said precipitate with salt in said chamber by passing the salt therethrough and simultaneously moving the chamber to agitate the salt.

8. The improved method of producing a preservative which consists in subjecting smoke to an electrical field in a suitable chamber and precipitating constituents of the smoke upon the wall of said chamber, and mixing said precipitate with salt in said chamber by passing the salt therethrough, and simultaneously revolving the chamber to agitate the salt and smoke precipitate.

9. The improved method of producing a preservative which consists in subjecting smoke adjacent a suitable moving body to the action of an electrical field, thereby collecting the smoke constituents precipitated by the field on said body, and removing the precipitate from the body by an abradant action thereon of a body of salt, thereby mixing the precipitate with said salt.

10. The improved method of producing a preservative which consists in subjecting smoke adjacent a suitable moving body to the action of an electrical field, thereby collecting the smoke constituents precipitated by the field on said body, removing the precipitate from the body by an abradant action thereon, and mixing salt with said precipitate.

11. The improved method of producing a preservative which consists in subjecting smoke in a revolving chamber to an electrical field, thereby precipitating the constituents of the smoke upon the wall of the chamber, introducing salt into said chamber and revolving it in such a way that the abradant action of the salt on the wall of the chamber removes the precipitate therefrom.

12. The improved method of producing a preservative which consists in subjecting smoke within a revolving drum to the action of an electrical field thereby precipitating constituents from the smoke and introducing salt into said revolving drum whereby the movement of the drum intermingles the salt and smoke precipitate.

13. The improved method of manufacturing smoked salt which consists in introducing salt in its natural state into a drum, producing genuine smoke by the combustion of wood, conducting the smoke as it is produced and in an unadulterated state into said drum, said drum having substantially imperforate walls whereby to confine the smoke, moving and agitating the salt in said drum by revolving the latter and thereby repeatedly showering the salt through the smoke and coating the salt particles, and removing the salt from the drum after it has been coated by the smoke.

In testimony whereof I have hereunto set my hand.

JAMES N. ALSOP.

CERTIFICATE OF CORRECTION.

Patent No. 1,719,354.            Granted July 2, 1929, to

JAMES N. ALSOP.

It is hereby certified that the above numbered patent was erroneously issued to the inventor, said "Alsop", whereas said patent should have been issued to "Smoked Products Company, Incorporated, of Cincinnati, Ohio, a Corporation of Ohio", said corporation being assignee of the entire interest in said invention, as shown by the records of assignments in this office; and that the said Letters Patent should be read with this correction therein that the same may conform to the record of the case in the Patent Office.

Signed and sealed this 13th day of August, A. D. 1929.

(Seal)

M. J. Moore,
Acting Commissioner of Patents.

8. The improved method of producing a preservative which consists in subjecting smoke to an electrical field in a suitable chamber and precipitating constituents of the smoke upon the wall of said chamber, and mixing said precipitate with salt in said chamber by passing the salt therethrough, and simultaneously revolving the chamber to agitate the salt and smoke precipitate.

9. The improved method of producing a preservative which consists in subjecting smoke adjacent a suitable moving body to the action of an electrical field, thereby collecting the smoke constituents precipitated by the field on said body, and removing the precipitate from the body by an abradant action thereon of a body of salt, thereby mixing the precipitate with said salt.

10. The improved method of producing a preservative which consists in subjecting smoke adjacent a suitable moving body to the action of an electrical field, thereby collecting the smoke constituents precipitated by the field on said body, removing the precipitate from the body by an abradant action thereon, and mixing salt with said precipitate.

11. The improved method of producing a preservative which consists in subjecting smoke in a revolving chamber to an electrical field, thereby precipitating the constituents of the smoke upon the wall of the chamber, introducing salt into said chamber and revolving it in such a way that the abradant action of the salt on the wall of the chamber removes the precipitate therefrom.

12. The improved method of producing a preservative which consists in subjecting smoke within a revolving drum to the action of an electrical field thereby precipitating constituents from the smoke and introducing salt into said revolving drum whereby the movement of the drum intermingles the salt and smoke precipitate.

13. The improved method of manufacturing smoked salt which consists in introducing salt in its natural state into a drum, producing genuine smoke by the combustion of wood, conducting the smoke as it is produced and in an unadulterated state into said drum, said drum having substantially imperforate walls whereby to confine the smoke, moving and agitating the salt in said drum by revolving the latter and thereby repeatedly showering the salt through the smoke and coating the salt particles, and removing the salt from the drum after it has been coated by the smoke.

In testimony whereof I have hereunto set my hand.

JAMES N. ALSOP.

CERTIFICATE OF CORRECTION.

Patent No. 1,719,354.  Granted July 2, 1929, to

JAMES N. ALSOP.

It is hereby certified that the above numbered patent was erroneously issued to the inventor, said "Alsop", whereas said patent should have been issued to "Smoked Products Company, Incorporated, of Cincinnati, Ohio, a Corporation of Ohio", said corporation being assignee of the entire interest in said invention, as shown by the records of assignments in this office; and that the said Letters Patent should be read with this correction therein that the same may conform to the record of the case in the Patent Office.

Signed and sealed this 13th day of August, A. D. 1929.

(Seal)

M. J. Moore,
Acting Commissioner of Patents.